United States Patent
Moasherziad et al.

(10) Patent No.: US 10,486,520 B2
(45) Date of Patent: Nov. 26, 2019

(54) HYBRID MODULE SHIPPING ASSEMBLY

(71) Applicant: Schaeffler Technologies AG & Co. KG, Herzogenaurach (DE)

(72) Inventors: Mohammad Moasherziad, Fairlawn, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 15/706,310

(22) Filed: Sep. 15, 2017

(65) Prior Publication Data

US 2019/0084401 A1 Mar. 21, 2019

(51) Int. Cl.
| | |
|---|---|
| B60K 6/405 | (2007.10) |
| B60K 6/38 | (2007.10) |
| B65D 85/68 | (2006.01) |
| F16H 57/00 | (2012.01) |
| B65D 41/62 | (2006.01) |
| B60K 6/48 | (2007.10) |

(52) U.S. Cl.
CPC ............. B60K 6/405 (2013.01); B60K 6/38 (2013.01); B65D 85/68 (2013.01); F16H 57/00 (2013.01); *B60K 2006/4825* (2013.01); *B60Y 2304/072* (2013.01); *B60Y 2304/076* (2013.01); *B60Y 2304/078* (2013.01); *B65D 41/62* (2013.01); *B65D 2585/6882* (2013.01); *F16D 2300/26* (2013.01); *F16H 2057/0093* (2013.01)

(58) Field of Classification Search
CPC ............. B65D 85/68; B65D 2585/6877; B65D 2585/6875; B65D 41/62; B60K 6/405; B60K 6/38; B65G 1/14; F16H 57/00; B60P 7/06

USPC ............... 206/319; 108/55.1; 181/204; 410/2
See application file for complete search history.

(56) References Cited

U.S. PATENT DOCUMENTS

| | | | | | |
|---|---|---|---|---|---|
| 4,174,036 | A | * | 11/1979 | Beckman | B65D 81/022 206/223 |
| 4,403,697 | A | * | 9/1983 | Forshee | B65G 1/14 108/55.3 |
| 5,275,279 | A | * | 1/1994 | Grigsby | B65D 85/68 206/319 |
| 5,511,916 | A | * | 4/1996 | Farley | B60P 7/06 264/102 |
| 6,462,459 | B1 | * | 10/2002 | Kirkman | B65D 5/5038 206/319 |
| 8,601,772 | B2 | * | 12/2013 | Turpin | F01N 1/00 181/204 |
| 9,917,482 | B2 | * | 3/2018 | Lindemann | H02K 7/006 |
| 10,040,579 | B1 | * | 8/2018 | Henderson | B65D 85/68 |

(Continued)

*Primary Examiner* — Steven A. Reynolds
(74) *Attorney, Agent, or Firm* — Davidson, Davidson & Kappel, LLC

(57) ABSTRACT

A hybrid module shipping assembly includes a hybrid module configured for arrangement in a torque path upstream from a transmission and downstream from an internal combustion engine. The hybrid module includes a hybrid drive unit, a housing fixed to a front side of the hybrid drive unit and a torque converter fixed to a rear side of the hybrid drive unit. The torque converter includes an impeller hub. The hybrid module shipping assembly also includes a cap assembly inserted in the impeller hub and a shipping dome fixed to the housing such that the housing and shipping dome encase the hybrid drive unit, the torque converter and the cap assembly.

12 Claims, 7 Drawing Sheets

(56) References Cited

U.S. PATENT DOCUMENTS

| | | | | |
|---|---|---|---|---|
| 2008/0072586 A1* | 3/2008 | Hammond | ............... | B60K 6/26 |
| | | | | 60/330 |
| 2009/0297287 A1* | 12/2009 | Entwistle | ............... | B65D 19/44 |
| | | | | 410/2 |
| 2017/0023171 A1* | 1/2017 | Khan | ..................... | F16M 11/26 |

* cited by examiner

HYBRID MODULE SHIPPING ASSEMBLY

The present disclosure relates generally to hybrid motor vehicle drive trains and more specifically to hybrid modules shipping assemblies.

BACKGROUND

The architecture of a hybrid module can dictate that the transmission side rotor support is not secured during handling outside the transmission. Shipping in an unsupported condition is a concern as the assembly can be damaged. Torque converters use plastic shipping caps to protect the pump hub but the torque converter does not need tightly positioned during shipment.

SUMMARY OF THE INVENTION

A hybrid module shipping assembly is provided. The shipping assembly includes a hybrid module configured for arrangement in a torque path upstream from a transmission and downstream from an internal combustion engine. The hybrid module includes a hybrid drive unit, a housing fixed to a front side of the hybrid drive unit and a torque converter fixed to a rear side of the hybrid drive unit. The torque converter includes an impeller hub. The hybrid module shipping assembly also includes a cap assembly inserted in the impeller hub and a shipping dome fixed to the housing such that the housing and shipping dome encase the hybrid drive unit, the torque converter and the cap assembly.

Embodiments of the hybrid module shipping assembly may include one or more of the following features:

an input shaft configured for connecting to the internal combustion engine, the input shaft protruding axially through the housing;

the hybrid module includes an electric motor and a clutch, the clutch configured for selectively connecting torque converter to the input shaft or disconnecting the torque converter from the input shaft;

the cap assembly includes a plug inserted in the impeller hub, the plug including an axially extending portion contacting an inner circumferential surface of the impeller hub;

the cap assembly includes a seal axially sandwiched between a rim of the impeller hub and the shipping dome;

the rim includes an inner inclined edge forcing the seal axially against an axially facing radially extending surface of a radially extending portion of the plug and radially inward against an outer circumferential surface of a radially inner axially extending portion of the plug;

the shipping dome includes a protrusion at a center of a rear section thereof, the protrusion extending into the plug;

the cap assembly includes a radially inner axially extending portion radially inside of the axially extending portion, the radially inner axially extending portion contacting an outer circumferential surface of the protrusion;

the cap assembly includes a radially extending dome abutting portion extending from the radially inner axially extending portion along an inner axially facing radially extending surface of the shipping dome;

the cap assembly is fixed to the shipping dome;

the cap assembly is fixed to the shipping dome by an inner diameter of an axially extending portion of the cap assembly engaging an outer diameter surface of a protrusion at a center of a rear section of the shipping dome;

the cap assembly is fixed to the shipping dome by radially outwardly extending tabs of the cap assembly engaging an inwardly protruding segment of a rear section of the shipping dome.

A method of packaging a hybrid module for shipping is also provided. The method includes providing a hybrid module configured for arrangement in a torque path upstream from a transmission and downstream from an internal combustion engine. The hybrid module includes a hybrid drive unit including an electric motor, a housing fixed to a front side of the hybrid drive unit and a torque converter fixed to a rear side of the hybrid drive unit. The torque converter includes an impeller hub. The method also includes inserting a cap assembly in the impeller hub and fixing a shipping dome to the housing such that the housing and shipping dome encase the hybrid drive unit, the torque converter and the cap assembly.

Embodiments of the method may include one or more of the following features:

providing an input shaft configured for connecting to the internal combustion engine, the input shaft protruding axially through the housing;

the cap assembly includes a plug, the inserting of the cap assembly including inserting the plug in the impeller hub such that an axially extending portion of the plug contacts an inner circumferential surface of the impeller hub;

the cap assembly includes a seal, the shipping dome being fixed to the housing such that the seal is axially sandwiched between a rim of the impeller hub and the shipping dome;

the shipping dome includes a protrusion at a center of a rear section thereof, the fixing the shipping dome to the housing including inserting the protrusion into the plug;

the fixing the shipping dome to the housing including contacting a radially extending portion of the plug with an inner axially facing radially extending surface of the shipping dome;

during the fixing of the shipping dome to the housing the cap assembly becomes fixed to the shipping dome.

BRIEF DESCRIPTION OF THE DRAWINGS

The present invention is described below by reference to the following drawings, in which.

DETAILED DESCRIPTION

The present disclosure provides a hybrid module shipping assembly for shipping a hybrid module. The shipping assembly includes an aluminum shipping dome shaped, which is configured similar to a transmission bellhousing, fixed to a housing of the hybrid module. A plastic shipping cap installed in a torque converter of the hybrid module includes an o-ring for some radial compliance between the cap and a pump hub. Prior to shipping, the dome is installed on the housing and prongs on the shipping cap snap into the dome so that the shipping cap is removed when the dome is removed as requested by the customer. The cap is radially centered on a cylindrical surface of the dome.

Figure 1:
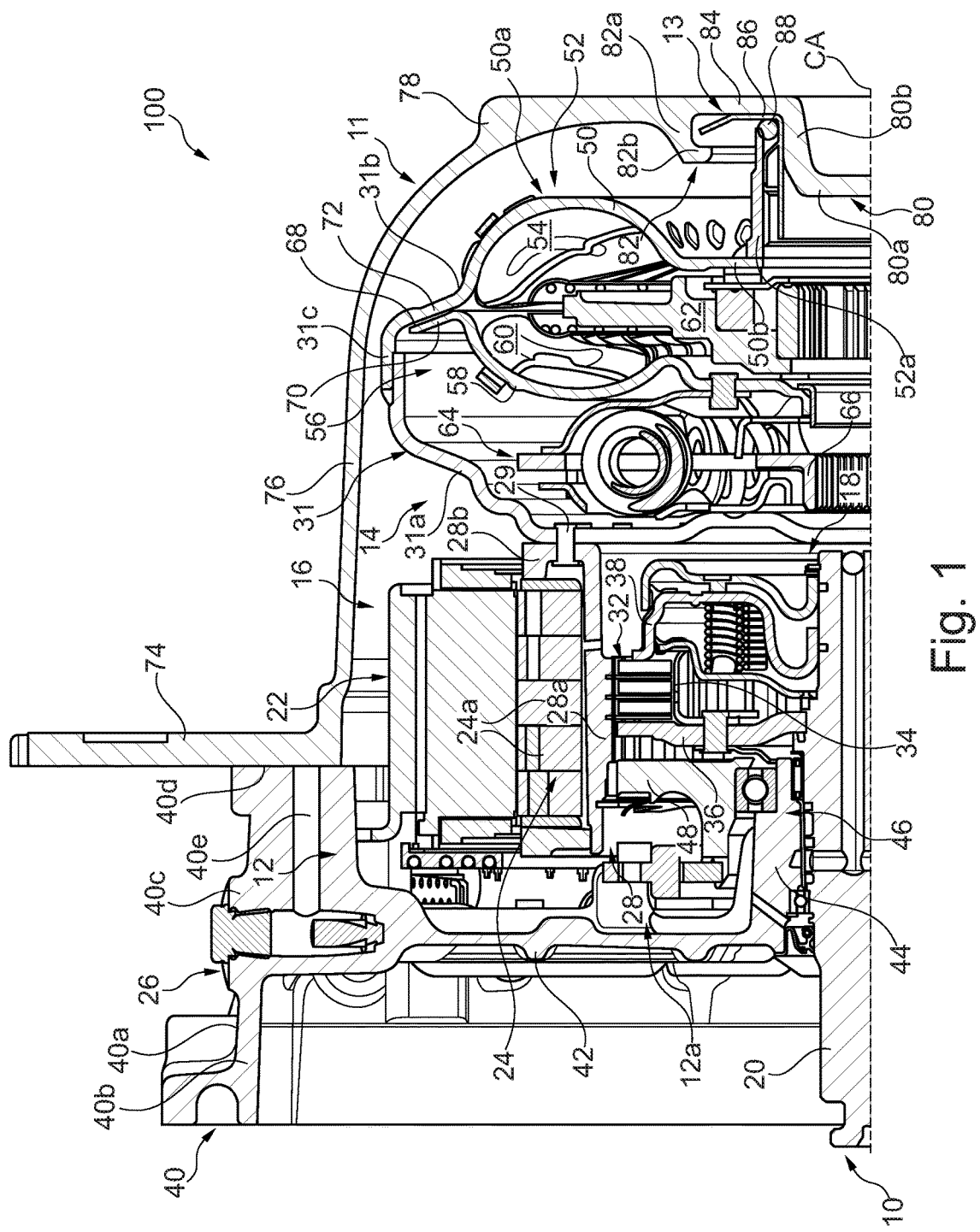
FIG. 1 shows a hybrid module shipping assembly in accordance with an embodiment of the present invention.

FIG. 1 shows hybrid module shipping assembly 100 in accordance with an embodiment of the present invention. Shipping assembly 100 includes a hybrid module 10, a shipping dome 11 and an impeller hub cap assembly 13.

Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid module 10. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier hub 28. Rotor carrier hub 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier hub 28 by a plurality of fasteners 29 passing through a cover 31 of torque converter 14.

Clutch 18 includes a plurality of clutch plates 30, at least some of which are supported in an axially slidable manner at outer diameter ends thereof by splines 32 formed on an inner circumferential surface of axially extending section 28a. At least one of clutch plates 30 are supported in an axially slidable manner at inner diameter ends thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier hub 28, which then transmits the received torque to damper assembly 14.

Housing 26 includes an axially extending radially outer section 40 forming an outer rim of housing 26 and defining an outer circumferential surface 40a of housing 26 and a radially extending section 42 extending radially inward from outer section 40. Outer section 40 includes a front cylindrical portion 40b protruding axially from radially extending section 42 in a frontward direction away from drive unit 12 and a rear cylindrical portion 40c protruding axially from radially extending section 42 in a rearward direction toward torque converter 14. Rear portion 40c includes a rear axially facing radially extending surface 40d that includes a transmission fluid inlet channel 40e axially extending therefrom into rear portion 40c for providing transmission fluid to motor 16 to cool motor 16 during operation. At a radially inner end of section 42, housing 26 further includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to axially extending section 28a of rotor carrier hub 28. Housing 26, via section 42 and protrusion 44, encases drive unit 12 at a front side 12a thereof and, via rear portion 40c of outer section 40, encases a portion of the outer circumferential surface of drive unit 12—i.e., a portion of the outer circumferential surface of stator 22.

Torque converter 14 includes a front cover 31a and a rear cover 31b together forming cover 31, with fasteners 29 passing axially through a radially extending section of front cover 31a, which extends radially inward to intersect center axis CA. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54. An inner radial extension 50b extends radially inward from rounded portion 50a and joins an axially extending cylindrical hub 52a of impeller 52.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Shipping dome 11 is removably fixed to housing 26 and encases a remaining portion of the outer circumferential surface of drive unit 12 not encased by outer section 40 of housing 26 and encases an entirety of torque converter 14. Shipping dome 11 is formed of aluminum and is shaped similar to a transmission bellhousing. Shipping dome 11 includes an outer flange 74 fixed to housing 26. Flange 74 is annularly shaped and portions thereof extend radially outward past outer circumferential surface 40a of housing 26. Flange 74 includes an axially frontward facing radially extending surface 74a axially abutting radially extending surface 40d, thereby covering transmission fluid inlet channel 40e. Dome 11 further includes an axially extending section 76 protruding axially rearward from a radially inner end of flange 74. A majority of axially extending section 76 has a frustoconical shape and, while tapering radially inward, section 76 extends along an exterior of rear portion of drive unit 12, along an exterior of front cover 31a of torque converter 14, and then along an exterior of an outer axially extending section 31c of rear cover 31b. Shipping dome 11 also includes a rear section 78 joined to axially extending section 76. Rear section 78 is bowl-shaped and curves radially inward from section 76 around a rear surface of impeller shell 50. Rear section 78 extends around wall 72, and past rounded portion 50a, inner radial extension 50b and impeller hub 52a to intersect center axis CA.

Rear section 78 includes a cup-shaped protrusion 80 extending axially toward torque converter 14 at the center of section 78 that includes a circular radially extending center base 80a intersecting center axis CA and a cylindrical axially extending wall 80b extending axially away from the radially outer edges of base 80a. Protrusion 80 is arranged radially inside of impeller hub 52a. Radially outside of protrusion 80, rear section 78 includes an inwardly protruding segment 82 extending axially toward torque converter 14. Protrusion 80 and segment 82 are connected by a radially extending wall 84 extending radially outward from a rear end of wall 80b. Segment 82 is arranged radially outside of impeller hub 52a and includes an axially extending portion 82a extending axially inward from wall 84 and a radially extending portion 82b extending radially inward from axially extending portion 82a.

Impeller hub cap assembly 13 includes a shipping plug 86 and a seal 88. Shipping plug 86, which in one preferred embodiment is formed of plastic, is provided in between rear section 78 of shipping dome 11 and impeller hub 52a. Seal 88, which in a preferred embodiment is a soft rubber o-ring, is provided between plug 86 and impeller hub 52a. Plug 86 is mounted radially between wall 80b of protrusion 80 and impeller hub 52a and axially between wall 84 and impeller hub 52a. Plug 86 contacts an outer circumferential surface of wall 80b of protrusion 80 and an inner circumferential surface of impeller hub 52a.

Figure 2:
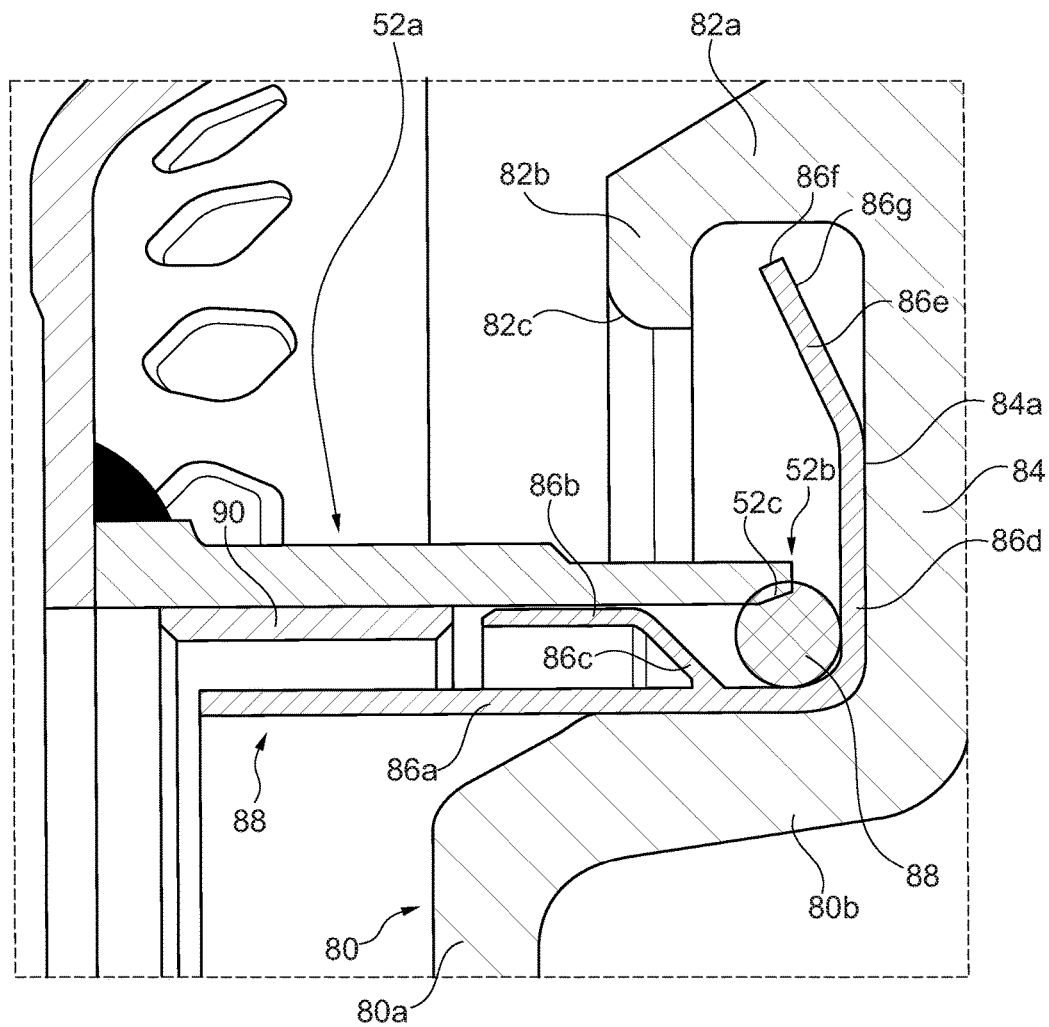
FIG. 2 shows an enlarged view of a portion of FIG. 1 illustrating the installation of a cap assembly of the hybrid module shipping assembly in between a rear section of a shipping dome and an impeller hub.

FIG. 2 shows an enlarged view illustrating the installation of cap assembly 13 in between rear section 78 of shipping dome 11 and impeller hub 52a. Radially inside of impeller hub 52a, plug 86 includes radially inner axially extending portion 86a and a radially outer axially extending portion 86b. Radially inner axially extending portion 86a extends parallel to center axis CA and contacts the outer circumferential surface of wall 80b and extends axially forward past wall 80b. Radially outer axially extending portion 86b extends parallel to center axis CA and contacts the inner circumferential surface of hub 52a. Impeller hub 52a is also provided with a bushing 90 on the inner circumferential surface thereof, which is positioned radially outside of portion 86a. Bushing 90 is axially offset frontward from portion 86b. Portion 86b is axially shorter in length than portion 86a such that the inner circumferential surface of hub 52a can accommodate both bushing 90 and portion 86b.

Plug 86 further includes a radially extending connecting section 86c joining portion 86b to portion 86a and a radially extending dome abutting portion 86d extending along an inner axially facing radially extending surface 84a of wall 84. Portion 86c is axially spaced frontward from portion 86d and extends axially such that portion 86c is inclined with respect to center axis CA (FIG. 1). Seal 88 is provided in the space axially between portion 86c and portion 86d such that seal 88 is mounted on plug 86 and seal 88 and plug 86 are installable together on impeller hub 52a as a single cap assembly 13. On a radially outer end of portion 86d, plug 86 further includes a plurality of circumferentially spaced retaining segments 86e. Segments 86e extend radially outward from portion 86d while extending axially frontward such that an outer radial ends 86f of segments 86e are positioned axially between radially extending portion 82b of inwardly protruding segment 82 and wall 84.

In packaging hybrid module 10 for shipping, cap assembly 13 is first installed inside of impeller hub 52a. Cap assembly 13 is slid into impeller hub 52a such that the outer circumferential surface of radially outer axially extending portion 86b of plug 86 contacts the inner circumferential surface of impeller hub 52a and seal 88 contacts a rim 52b of impeller hub 52a, more specifically an inner inclined edge 52c of rim 52b. Inner inclined edge 52c forces seal 88 axially against an axially facing radially extending surface of portion 86d and radially inward against the outer circumferential surface of portion 86a. After plug 86 is installed, shipping dome 11 is installed on hybrid module 10 by inserting protrusion 80 into plug 86, such that the outer circumferential surface of cylindrical axially extending wall 80b contacts the inner circumferential surface of radially inner axially extending portion 86a and inner axially facing radially extending surface 84a of wall 84 contacts radially extending dome abutting portion 86d. As protrusion 80 is slid into plug 86, a frontward facing contact surface 82c of radially extending portion 82b of inwardly protruding segment 82 contacts rearward facing contact surfaces 86g of segments 86e such that segments 86e are bent radially inwardly until inwardly protruding segment 82 passes segments 86e, at which time segments 86e snap back radially outward. Inwardly protruding segment 82 may then limit the axial movement of cap assembly 13 via axial contact with inwardly protruding segment 82. Accordingly, during the installation of shipping dome 11 on housing, cap assembly 13 becomes fixed to shipping dome 11 by segments 82.

Figure 3:
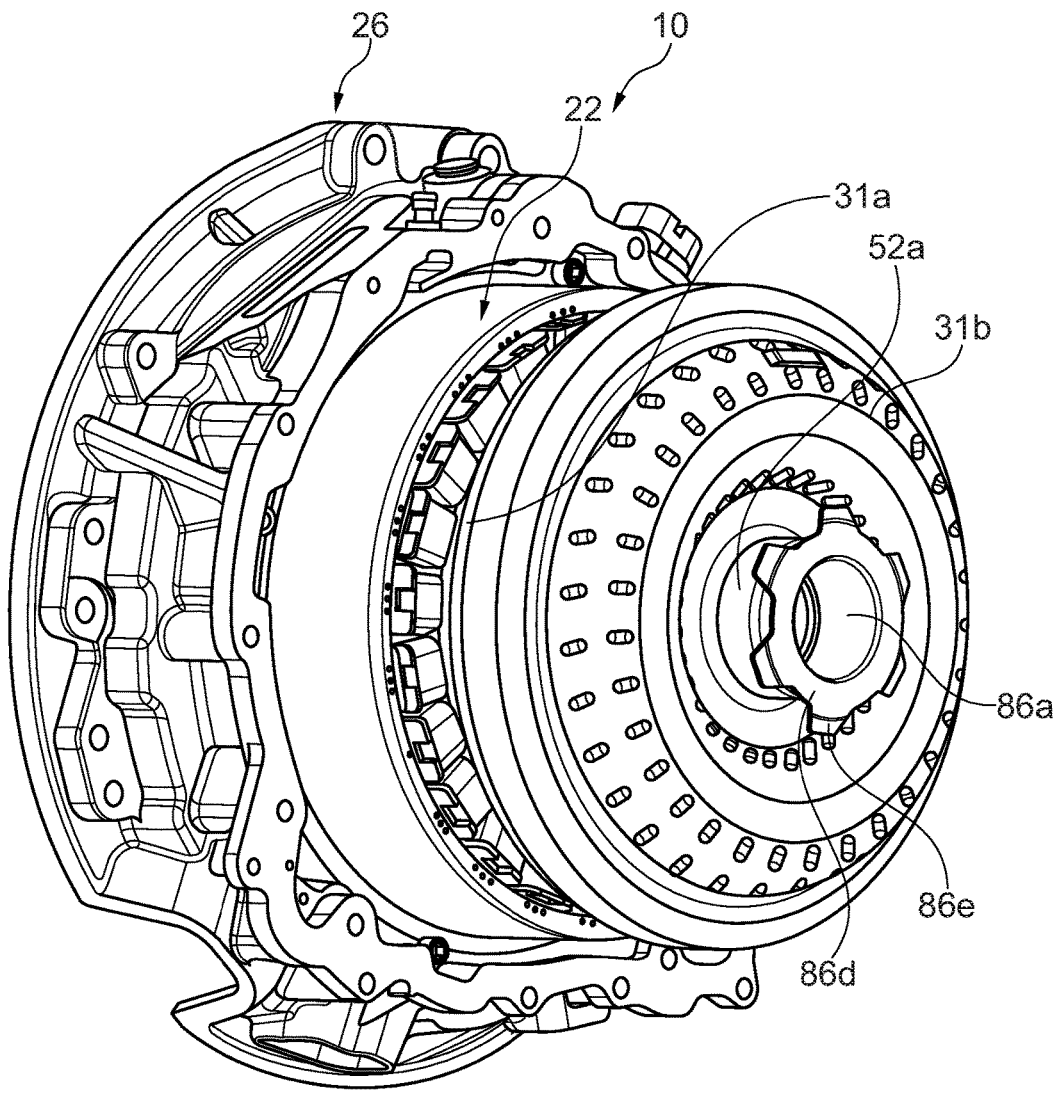
FIG. 3 shows a perspective view of the hybrid module of FIG. 1 after the cap assembly has been installed on impeller hub, but before the shipping dome is installed on the hybrid module.

FIG. 3 shows a perspective view of hybrid module 10 after cap assembly 13 has been installed on impeller hub 52a, but before shipping dome 11 is installed on hybrid module 10. FIG. 3 illustrates housing 26, stator 22, front cover 31a, rear cover 31b, impeller hub 52a and plug 86. Circumferentially spaced segments 86e are clearly illustrated, extending radially outward and axially frontward from radially extending dome abutting portion 86*d*. Radially inner axially extending cylindrical portion 86*a* extends axially from the inner edge of portion 86*d*.

Figure 4:
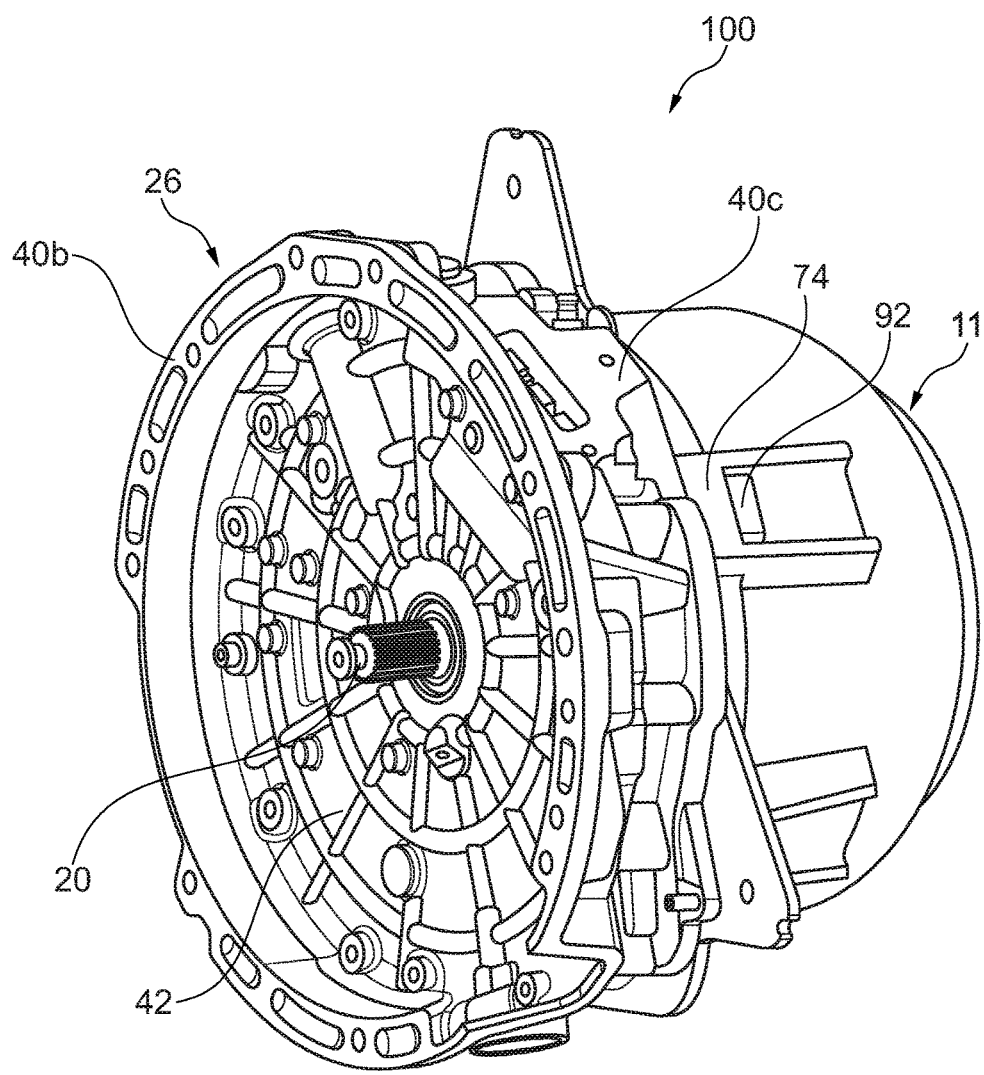
FIG. 4 shows a perspective view of the hybrid module of FIG. 1 after the shipping dome is installed on the hybrid module.

FIG. 4 shows a perspective view of hybrid module 10 after shipping dome 11 is installed on hybrid module 10. As shown in FIG. 4, housing 26 and shipping dome 11 completely encase drive unit 12 and torque converter 14, with input shaft 20 protruding out of a hole formed in radially extending section 42 of housing 26. Fasteners 92 extend through flange 74 of shipping dome 11 into rear cylindrical portion 40*c* of housing 26.

Figure 5:
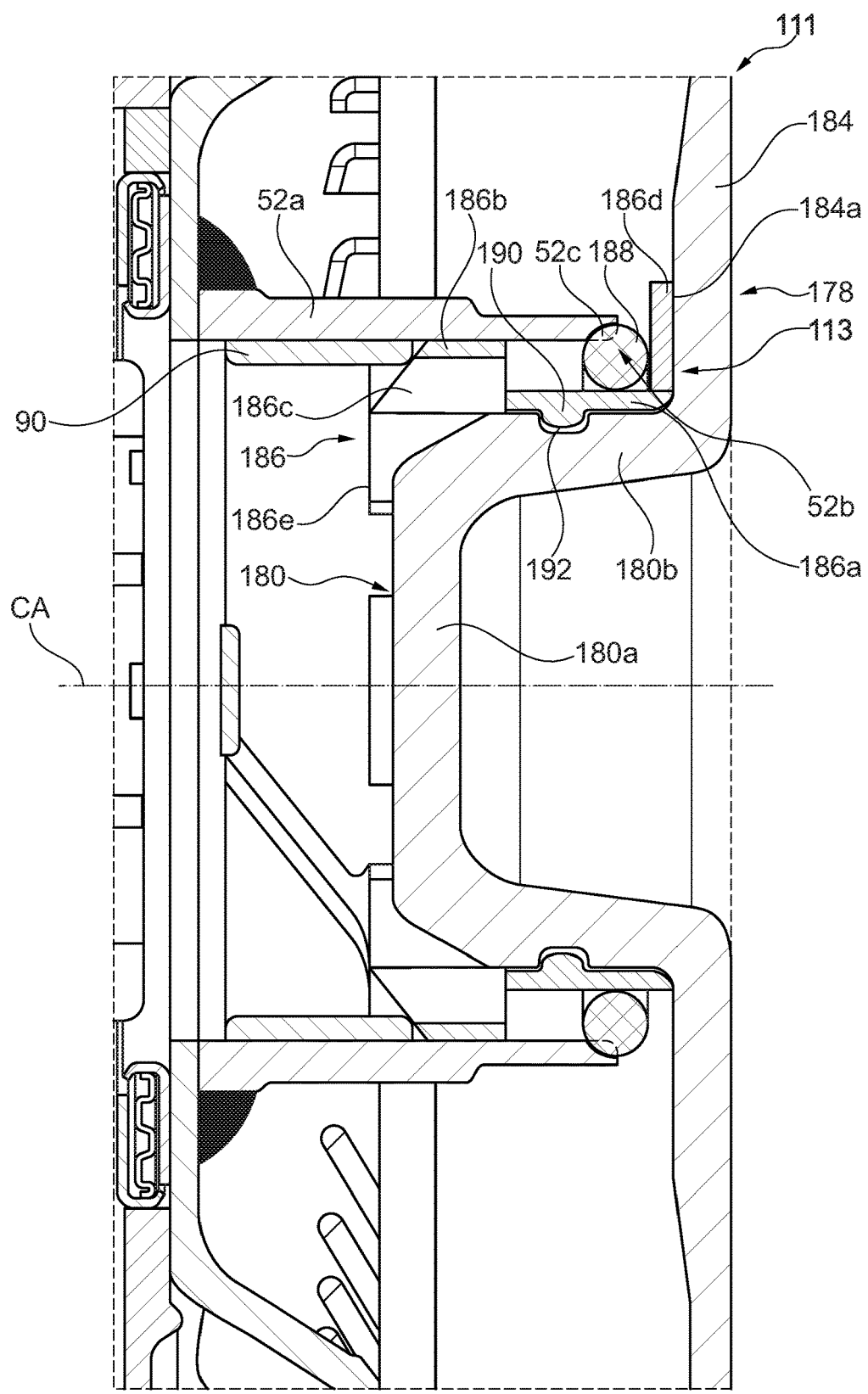
FIG. 5 shows an enlarged view cross-sectional view illustrating the installation of an impeller hub cap assembly in accordance with another embodiment of the present invention between a rear section of a shipping dome and impeller hub.
Figure 6:
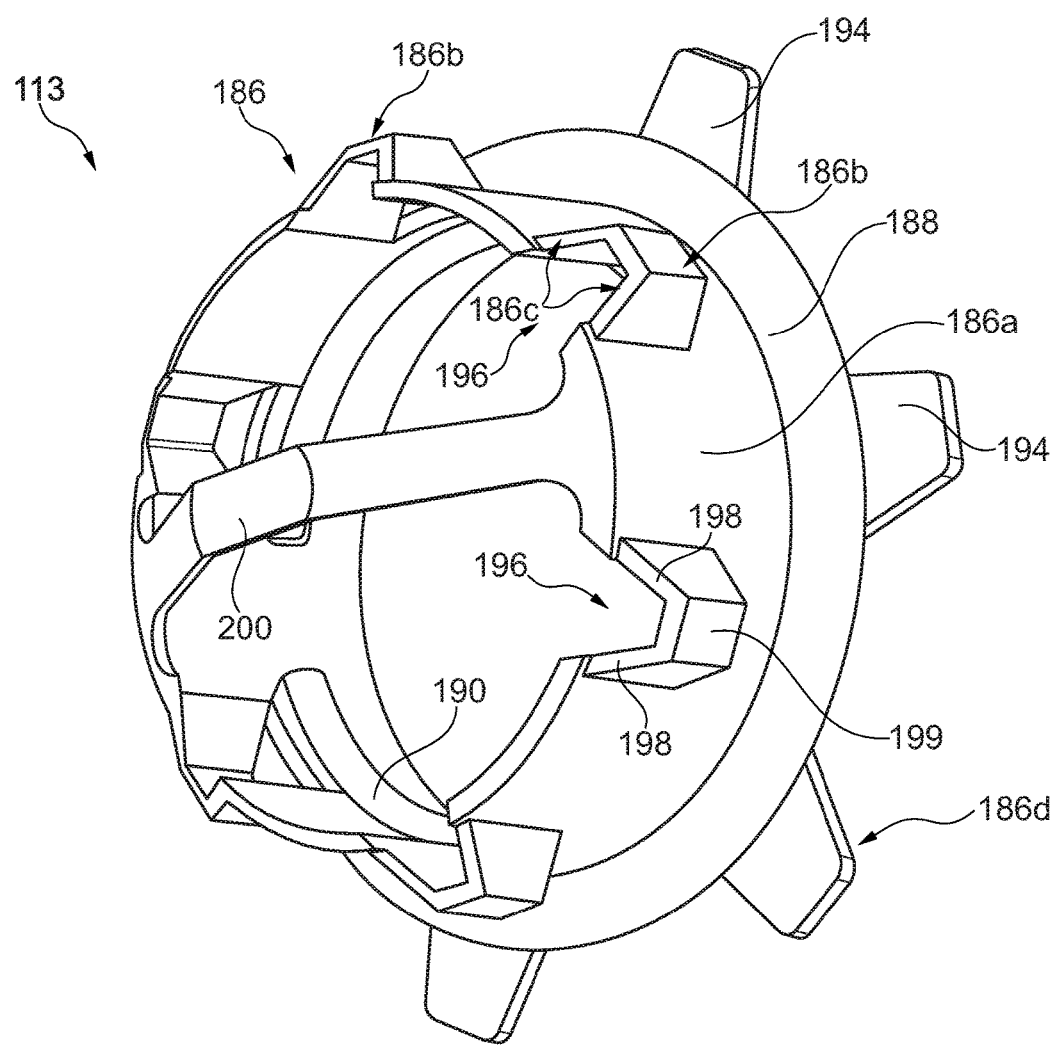
FIG. 6 shows a perspective view of cap assembly shown in FIG. 5.
Figure 7:
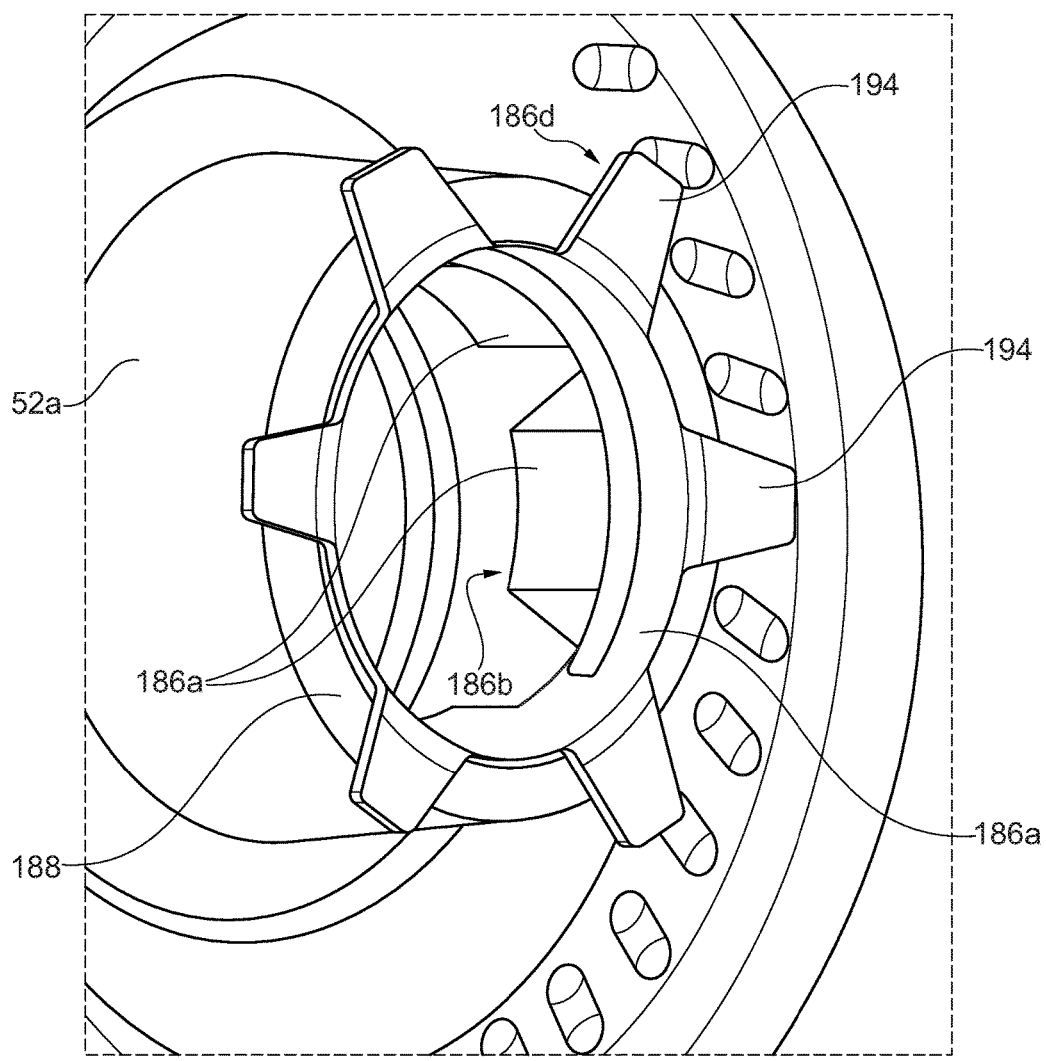
FIG. 7 shows a perspective view of cap assembly shown in FIGS. 5 and 6 installed on impeller hub before the installation of the shipping dome.

FIG. 5 shows an enlarged view cross-sectional view illustrating the installation of an impeller hub cap assembly 113 in accordance with another embodiment of the present invention between a rear section 178 of a shipping dome 111 and impeller hub 52*a*. FIG. 6 shows a perspective view of cap assembly 113, FIG. 7 shows a perspective view of cap assembly installed on impeller hub 52*a* before the installation of shipping dome 111. Cap assembly 113 includes a shipping plug 186 and a seal 188. Shipping plug 186, which in one preferred embodiment is formed of plastic, is provided in between rear section 178 of shipping dome 111, which unless otherwise described below is identical to shipping dome 11, and impeller hub 52*a*. Seal 188, which in a preferred embodiment is a soft rubber o-ring, is provided between plug 186 and impeller hub 52*a*.

Rear section 178 includes a cup-shaped protrusion 180 extending axially toward torque converter 14 at the center of section 178. Protrusion 180 includes a circular radially extending center base 180*a* intersecting center axis CA and a cylindrical axially extending wall 180*b* extending axially away from the radially outer edges of base 180*a*. Plug 186 is mounted radially between a wall 180*b* of a protrusion 180 of shipping dome 111 and impeller hub 52*a* and axially between a radially extending wall 184, which extends radially outward from a rear end of wall 180*b*, and impeller hub 52*a*. Plug 186 contacts an outer circumferential surface of wall 180*b* of protrusion 180 and the inner circumferential surface of impeller hub 52*a*.

Radially inside of impeller hub 52*a*, plug 186 includes radially inner axially extending portion 186*a* and a radially outer axially extending portion 186*b*. Radially inner axially extending portion 186*a* extends parallel to center axis CA and contacts and the outer circumferential surface of wall 180*b*. Radially outer axially extending portion 186*b* extends parallel to center axis CA and contacts and the inner circumferential surface of hub 52*a*. Bushing 90 on the inner circumferential surface of impeller hub 52*a* is positioned axially offset frontward from portion 186*b*.

Plug 186 further includes a radially extending connecting section 186*c* joining portion 186*b* to portion 186*a* and a radially extending dome abutting portion 186*d* extending along an inner axially facing radially extending surface 184*a* of wall 184. Portion 186*c* is axially spaced frontward from portion 186*d* and extends radially inward from portion 186*b* to join portion 186*a*. Seal 188 is provided in the space axially between portion 186*c* and portion 186*d* such that seal 188 is mounted on plug 186 and seal 188 and plug 86 are installable together on impeller hub 52*a* as a single cap assembly 113. At the inner circumferential surface thereof, portion 186*a* is provided with an engagement protrusion 190, which is formed by a plurality of arc segments or a ring, configured for mating with an engagement groove 192 provided in the outer circumferential surface of wall 180*b* of protrusion 180.

In packaging hybrid module 10 for shipping, cap assembly 113 is first installed inside of impeller hub 52*a*. Cap assembly 113 is slid into impeller hub 52*a* such that the outer circumferential surface of radially outer axially extending portion 186*b* of plug 186 contacts the inner circumferential surface of impeller hub 52*a* and seal 188 contacts rim 52*b* of impeller hub 52*a*, more specifically inner inclined edge 52*c* of rim 52*b*. Inner inclined edge 52*c* forces seal 188 axially against an axially facing radially extending surface of portion 186*d* and radially inward against the outer circumferential surface of portion 186*a*. After plug 186 is installed, shipping dome 111 is installed on hybrid module 10 by inserting protrusion 180 into plug 186, such that the outer circumferential surface of cylindrical axially extending wall 180*b* contacts the inner circumferential surface of radially inner axially extending portion 186*a* and inner axially facing radially extending surface 184*a* of wall 184 contacts radially extending dome abutting portion 186*d*. As protrusion 180 is slid into plug 186, protrusion 190 engages in groove 192 to limit the axial movement of cap assembly 113 via form-fitting connection. Accordingly, during the installation of shipping dome 111 on housing 26, cap assembly 113 becomes fixed to shipping dome 111 by protrusion 190.

As shown in FIG. 6, portion 186*d* is formed by a plurality of circumferentially spaced segments 194 protruding radially outward from portion 186*a*. Portion 186*a* has a substantially cylindrical shape with a plurality of radially extending connections 198, which together for portion 186*c*, protruding radially outward from portion 186*a* to define a plurality of circumferentially spaced gaps 196 in portion 186*d*. Portion 186*b* is defined by a plurality of circumferentially spaced arc segments 199. Each segment 199 is supported on portion 186*a* via two connections 198, which extend radially outward from portion 186*a* to opposite edges of the respective segment 199. A support bar 200 is provided at a torque converter facing axial end of portion circumferentially spaced arc segments 186*a* to provide further rigidity to plug 186.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
11 shipping dome
12 hybrid drive unit
12*a* front side
13 cap assembly
14 torque converter
16 electric motor
18 engine connect/disconnect clutch
20 input shaft
22 stator
24 rotor
24*a* magnet segments
26 housing
28 rotor carrier hub
28*a* cylindrical axially extending section
28*b* radially extending section
28*c* first axial end
28*d* second axial end 29 fasteners
30 clutch plates
31 cover
31a front cover
31b rear cover
32 splines
34 inner support
36 counter pressure plate
38 piston
40 axially extending radially outer housing section
40a outer circumferential surface
40b front cylindrical portion
40c rear cylindrical portion
40d rear axially facing radially extending surface
40e transmission fluid inlet channel
42 radially extending housing section
44 housing protrusion
46 ball bearing
48 rotor flange
50 impeller shell
50a rounded blade supporting portion
50b inner radial extension
52 impeller
52a axially extending cylindrical impeller hub
52b impeller hub rim
52c inner inclined surface
54 impeller blades
56 turbine
58 turbine shell
60 turbine blades
62 stator
64 damper assembly
66 support hub
68 friction material
70 outer radial extension
72 radially extending wall
74 flange
74a axially frontward facing radially extending surface
76 axially extending section
76a first spline section
76b second spline section
78 rear section
80 cup-shaped protrusion
80a circular radially extending center base
80b cylindrical axially extending wall
82 inwardly protruding segment
82a axially extending portion
82b radially extending portion
84 radially extending wall
86 shipping plug
86a radially inner axially extending cylindrical portion
86b radially outer axially extending portion
86c radially extending connecting section
86d radially extending dome abutting portion
86e circumferentially spaced retaining segments
86f outer radial ends
86g rearward facing contact surfaces
88 seal
90 bushing
92 fasteners
100 hybrid module shipping assembly
111 shipping dome
113 cap assembly
178 rear section
180 cup-shaped protrusion
180a circular radially extending center base
180b cylindrical axially extending wall
184 radially extending wall
184a radially extending surface
186 shipping plug
186a radially inner axially extending cylindrical portion
186b radially outer axially extending portion
186c radially extending connecting section
186d radially extending dome abutting portion
188 seal
190 engagement protrusion
192 groove
194 circumferentially spaced segments
196 circumferentially spaced gaps
198 radially extending connections
199 circumferentially spaced arc segments
200 support bar

What is claimed is:

1. A hybrid module shipping assembly comprising:
a hybrid module configured for arrangement in a torque path upstream from a transmission and downstream from an internal combustion engine, the hybrid module including a hybrid drive unit, a housing fixed to a front side of the hybrid drive unit and a torque converter fixed to a rear side of the hybrid drive unit, the torque converter including an impeller hub;
a cap assembly inserted in the impeller hub; and
a shipping dome fixed to the housing such that the housing and shipping dome encase the hybrid drive unit, the torque converter and the cap assembly.

2. The hybrid module shipping assembly as recited in claim 1 further comprising an input shaft configured for connecting to the internal combustion engine, the input shaft protruding axially through the housing.

3. The hybrid module shipping assembly as recited in claim 2 wherein the hybrid module includes an electric motor and a clutch, the clutch configured for selectively connecting the torque converter to the input shaft or disconnecting the torque converter from the input shaft.

4. The hybrid module shipping assembly as recited in claim 1 wherein the cap assembly includes a plug inserted in the impeller hub, the plug including an axially extending portion contacting an inner circumferential surface of the impeller hub.

5. The hybrid module shipping assembly as recited in claim 4 wherein the cap assembly includes a seal axially sandwiched between a rim of the impeller hub and the shipping dome.

6. The hybrid module shipping assembly as recited in claim 5 wherein the rim includes an inner inclined edge forcing the seal axially against an axially facing radially extending surface of a radially extending portion of the plug and forcing the seal radially inward against an outer circumferential surface of a radially inner axially extending portion of the plug.

7. The hybrid module shipping assembly as recited in claim 5 wherein the shipping dome includes a protrusion at a center of a rear section thereof, the protrusion extending into the plug.

8. The hybrid module shipping assembly as recited in claim 7 wherein the plug includes a radially inner axially extending portion radially inside of the axially extending portion of the plug, the radially inner axially extending portion contacting an outer circumferential surface of the protrusion.

9. The hybrid module shipping assembly as recited in claim 8 wherein the plug includes a radially extending dome abutting portion extending from the radially inner axially extending portion along an inner axially facing radially extending surface of the shipping dome.

10. The hybrid module shipping assembly as recited in claim 1 wherein the cap assembly is fixed to the shipping dome.

11. The hybrid module shipping assembly as recited in claim 10 wherein the cap assembly is fixed to the shipping dome by an inner diameter of an axially extending portion of the cap assembly engaging an outer diameter surface of a protrusion at a center of a rear section of the shipping dome.

12. The hybrid module shipping assembly as recited in claim 10 wherein the cap assembly is fixed to the shipping dome by radially outwardly extending tabs of the cap assembly engaging an inwardly protruding segment of a rear section of the shipping dome.

\* \* \* \* \*